United States Patent [19]
White

[11] Patent Number: 6,158,806
[45] Date of Patent: Dec. 12, 2000

[54] BICYCLE SEAT ASSEMBLY

[76] Inventor: Thomas H. White, P.O. Box 659, Carnation, Wash. 98014

[21] Appl. No.: 09/360,860

[22] Filed: Jul. 23, 1999

Related U.S. Application Data

[60] Provisional application No. 60/094,021, Jul. 24, 1998.
[51] Int. Cl.$^7$ ..................................................... B60N 2/38
[52] U.S. Cl. ......................... 297/195.1; D6/354; 297/202; 297/452.21
[58] Field of Search ........................... 297/195.1, 452.21, 297/452.23, 452.24, 452.26, 202, 201; D6/354

[56] References Cited

U.S. PATENT DOCUMENTS

| D. 348,785 | 7/1994 | White . | |
|---|---|---|---|
| 2,303,567 | 12/1942 | McWhorter et al. | 297/195.1 X |
| 3,503,649 | 3/1970 | Johnson | 297/452.26 |
| 4,132,228 | 1/1979 | Green | 297/452.26 X |
| 5,317,773 | 6/1994 | Graebe | 297/452.26 X |
| 5,791,736 | 8/1998 | Herbert | 297/452.21 |

FOREIGN PATENT DOCUMENTS

| WO 091001244 | 2/1991 | WIPO | 297/195.1 |
|---|---|---|---|

*Primary Examiner*—Peter M. Cuomo
*Assistant Examiner*—Stephen Vu
*Attorney, Agent, or Firm*—Robert B. Hughes; Hughes & Schacht, P.S.

[57] ABSTRACT

A bicycle seat assembly having a functional surface area comprising a main support surface region and a center tactile surface region. At the center tactile surface region there is a raised center surface portion and outwardly facing side tactile surface portions to engage upper rear and side thigh surface portions of the person. There are right and left and primary support zones spaced on opposite sides of the longitudinal axis to support the right and left ischial-tuberosities of the person who is in a seated pedaling position. The forward support surface portions on opposite sides of the center tactile surface region are contoured so that the leading edge thereof has an upward and rearward slope. The seat is arranged to accommodate 95% of the adult population in the U.S., and enables the cyclist to operate effectively in the seated pedaling mode, the seated non-pedaling mode and the stand-up pedaling mode. The seat provides proper support and hygienic safety by alleviating a load bearing relationship between the lower center body portion with the seat and yet providing for clearance, mobility, and comfort for the person.

20 Claims, 12 Drawing Sheets

BICYCLE SEAT ASSEMBLY

RELATED APPLICATIONS

This application claims priority of U.S. Provisional Patent Application Serial No. 60/094,021, which was filed on Jul. 24, 1998.

FIELD OF THE INVENTION

The present invention relates to a bicycle seat assembly, and more particularly to a bicycle seat having a functional surface area to provide proper support and hygienic benefit for the rider, and yet enable the person riding the bicycle to operate the bicycle with both comfort, mobility and proper clearance in the seated pedaling mode, the seated coasting mode, and the stand-up pedaling mode.

Bicycles have been with us since the time of Leonardo da Vinci. The basic design of a chain driven bicycle is shown in Leonardo's Codex Atlanticus. The sketch showing the design was not discovered until recently, and it is interesting to note that it shows a "saddle seat", similar to the types of bicycle seats that we have today. Also, some of the bicycles which were built and used in the 1800s were not chain driven but propelled by the rider paddling his feet on the ground. In this case the saddle was the only seat that would work because of the large excursion of both legs.

This design of the seat seems to have maintained its place, and has survived to this day as the basic design of the bicycle seat. The term "saddle" is likely an appropriate designation for this type of bicycle seat since the rider straddles the device with both legs and the "saddle" engages his or her body in load bearing relationship on the non-structural part of the body and organs between the legs. Thus, the present day saddles (i.e. bike seats) transmit the shock/pressure and the rider's weight to this non-structural area of the pelvis and fleshy area of the genitals.

It has been long known to dedicated bicycle riders that the conventional saddle seat can cause chafing, blistering, bruising and possibly injury to the cyclist. There have been various attempts in the prior art to design bicycle seats that provide greater comfort and hygienic safety. Yet there are other considerations that influence the design.

The cyclist will ride basically in three different modes. First, there is the seated pedaling mode where the buttocks of the cyclist remains in contact with the seat, while the cyclist is pedaling the bicycle. Second, there is the coasting mode where the cyclist remains seated and the feet of the cyclist are stationary, resting on the pedals. Third, there is the stand-up pedaling mode where the cyclist is pedaling to deliver increased power to the bicycle, and the buttocks of the cyclist are positioned upwardly and somewhat forwardly, without contacting the seat.

In the coasting mode, the cyclist is "taking a breather", and the primary concern is to be sitting comfortably and securely on the seat. In the seated pedaling mode, the cyclist is still concerned about comfort and secure seating, but there is also the considerations of clearance and mobility. These four factors are interrelated. In other words the cyclist wants to feel that he is being seated securely and comfortably (not susceptible to slipping off), and yet be able to execute the pedaling stroke of the legs without encountering any surface obstruction, particularly where it might result in unwanted rubbing contact or other cause of discomfort or injury.

In the stand-up pedaling mode, with the cyclist not even being in contact with the seat, the cyclist primarily does not want to have the seat get in the way. In the stand-up pedaling mode since the person's weight is shifted from one foot to the other as the alternative right/left pedaling strokes are executed, there is lateral movement back and forth of the upper part of the bicycle relative to the cyclist, and the cyclist wants to avoid unwanted contact with the seat.

Another aspect of the feeling of being comfortable and secure is that the person wants at all times to properly centered on the bicycle seat. For the experienced cyclist this is less of a concern since he or she has already developed enough skill so as to remain properly positioned on the bicycle seat without any tactile centering. However, for the average or less experienced cyclist there is generally that desire to have some sort of "centering" or "locating" contact with the bicycle seat to ensure that the person is properly positioned.

With regard to the subject of hygienic safety, dedicated and experienced bikers have long been familiar with the "aches and pains" resulting from continuous riding of a bicycle, particularly for long distances under competitive conditions. The bikers will quite often liberally apply a Vaseline type salve to the inside areas of the thighs to alleviate the chafing (and even bleeding) that can occur in those inner areas of the thighs.

Another one of the challenges which faces the designer of a bicycle seat results from the differences in the human anatomy. A smaller person has narrower hips than a larger person. Also there are people with large, muscular thighs and buttocks, while other people are rather slim. This complicates designing a seat that can accommodate people with these different physical characteristics while still providing secure and comfortable seating arrangement, with adequate support, clearance and mobility.

To provide bicycle seats economically, it is desirable that these could to a large extent be standardized, instead of being form fitted for each person individually. Therefore, this would mean that the bicycle would have to be designed with that elusive quality of "adaptability" without the sacrifice of the various qualities which should exist within the design. This truly does present a challenge.

To explore another problem area of the conventional saddle seat, a very important aspect which has become more prominent in more recent years is hygienic safety. It has long been suspected that the present design of bicycle seats can over a period of time result in problems of sexual impotency, and clinical data has now confirmed that this can and does occur.

To explore this issue of hygienic safety further, attention should be directed to the basic functioning of the male genitalia relative to sexual potency (or impotency). The process begins in the conscious or unconscious neurological signals which originates in the cerebral cortex and limbic systems, and which are sent to the hypothalamus and relayed down the spinal cord into the sympathetic and parasympathetic neurons of the penis. The nerve endings then release the neurotransmitters that relax the smooth inside cells lining the corporal bodies of the penis and arteries supplying blood to the penis. There are corporal bodies that are elongate members which extend the length of the penis and into the abdomen. For erection, more blood enters the corporal bodies than exits and the penis becomes rigid. The entire sequence of events from stimulus to erection can take place in a very short time period.

Many types of nerves and molecules participate in the signal transmission that culminate in the erection. The primary pathway is through autonomic nerve fibers that release molecules of nitric oxide near the smooth muscle cells of the penis. Regulation of the erection process depends on the concentration of the certain ions within the smooth muscle cells and those concentrations can be affected by other neurotransmitters.

Simply from reviewing these few aspects of the physical process of male sexuality, it is apparent that there is involved the proper blood flow, the neurological functions, and also the condition and function of the corporal bodies and other body components that relate to the erection process. At present, the medical community that is studying this area has not settled on any specific cause or combination of causes that relate impotency to the use of current saddle-type bicycle seats. However, there has developed a general consensus that the continued use of such bicycle seats over a period of time can be a source of impotency.

It has also been established that these types of problems also occur with females through the continued use of the saddle-type bicycle seat. It is believed not to be necessary to discuss the physiological consequences for females further, since the overall nature of the problem is substantially similar in terms of the end result for both the male and female person.

Years ago when the inventor in the present patent application had become cognizant of at least some of the problems outlined above, he designed a bicycle seat which incorporated a design philosophy which would alleviate at least some of the problems noted above, and particularly alleviate the problems associated with the conventional saddle-type bicycle seat relative to hygienic safety. This basic design is shown in his design patent DES 348,785 issuing Jul. 19, 1994.

The basic design philosophy of the particular seat shown in DES 348,758 was to provide a seat contour where the upper part of the human body is supported primarily by the ischial-tuberosities at the base of the pelvis, and also the fleshier part of the buttock in the area of the ischial-tuberosities. This distributes the body weight across a greater area and provides a more conventional seating posture. Also, it protects the genitals and inner parts of the thighs from chafing, blistering, bruising, and potential injury. There is also a center tactile positioning portion which extends forwardly from the center of the main seat section, and this is contoured so as to provide a centering function without having the shortcomings of the conventional saddle-type bicycle seat. This prior art bicycle seat is shown in FIGS. 20, 20A and 20B, and it will be discussed later in this text.

SUMMARY OF THE INVENTION

The bicycle seat of the present invention is arranged to operate effectively in the three basic operating modes, namely the seated pedaling mode, and seated coasting mode, a stand-up pedaling mode. The seat is arranged so that it will provide proper support and hygienic safety, and yet provide comfort, clearance and operating mobility.

The bicycle seat of the present invention is arranged to support a person having right and left buttocks, right and left ischial-tuberosities, right and left thighs and a center lower body portion located between the thighs.

This assembly comprises a bicycle seat comprising a front portion, a rear portion, two outer side portions and a longitudinal center axis extending through the front and rear portions. The bicycle seat has a functional surface area comprising a main support surface region and a center tactile surface region.

The main support surface region comprises a generally horizontal, upwardly facing main surface portion, and a forward support surface portion having right and left forward surface support sections extending forwardly and downwardly from the main support surface portion.

The center tactile surface region has a raised center surface portion, an outwardly facing side tactile surface portion to engage upper rear inside thigh surface portions of the person.

The bicycle seat has right and left upwardly facing primary support surface zones spaced from one another on opposite sides of the longitudinal axis, located at a forward part of the main support surface portion to engage the person's ischial-tuberosities in the seated pedaling mode.

The main support region has right and left leading edges, each of which has an inner leading edge location adjacent to the center tactile surface portion and two outer edge locations. Each of the outer leading edge surface locations is located forwardly of and longitudinally aligned with, its related primary support zone. The outer leading edge locations are positioned rearwardly of the inner leading edge locations.

The primary support zones are at a height relative to a center area of the functional surface region located between the primary support zones and forwardly therefrom, to maintain the center body portion out of varying contact with the functional surface region.

Also, in the preferred embodiment, with a broad range the outer leading edge location is no greater than 2.5 inches rearwardly of the inner leading edge location, and no less than 0.5 inch rearwardly of said inner leading edge location. Within a narrower range, the leading edge location is no greater than 1.6 inches rearwardly and no less than 0.7 inches rearwardly. An optimized location is where the outer leading edge location is located about 1.25 inches rearwardly of the inner leading edge location.

Also, in the preferred embodiment, the outer leading edge location is positioned vertically upwardly from the inner leading edge location. Within a broader range, the outer leading edge portion is located above the inner leading edge portion by a distance no greater than about 3.5 inch, and not less than about 0.5 inch. Within a narrower range, the leading edge location is located above the inner leading edge location by a distance no greater than about 2.6 inch and not less than about 1.2 inch. A preferred range is no greater than about 1.3 inch and not less than about 1.1 inch.

The seat assembly of the present invention can also be considered as having a plurality of vertically and longitudinally aligned reference planes, namely a first central reference plane located at the longitudinal axis, second inner reference planes located on opposite sides of the center tactile surface region and adjacent thereto, third intermediate reference planes located on opposite sides of the longitudinal axis and spaced approximately 2 inches therefrom, and two fourth outer reference planes located on opposite sides of the longitudinal axis and spaced therefrom by approximately 3.5 inches. The leading edges intersect the second, third and fourth reference planes at the aforementioned inner leading edge location, and an intermediate leading edge location, and the aforementioned outer leading edge location, respectively. Each of the intermediate leading edge locations is located rearwardly and upwardly of its related inner leading edge location, and each of the outer leading edge locations is located rearwardly of its related intermediate leading edge location, and each outer leading edge location is located rearwardly of its related intermediate leading edge location.

In the preferred embodiment, leading edge portions between the inner leading edge location and the intermediate leading edge location is at an upward and outward angle, viewed from a front location no greater than 70 degrees from the horizontal, and no less than 30 degrees from the horizontal. Within a narrower range, the leading edge portions between the intermediate leading edge locations would be no greater than 50 degrees from the horizontal and no less than 40 degrees from the horizontal.

Also, the leading edge portions between the inner leading edge location makes a horizontal angle, as viewed from the top of the seat assembly which is no greater than 40 degrees from a transverse axis, and not less than 5 degrees. Within a narrower range, this is not less than 30 degrees from a transverse axis, and not less than 10 degrees.

Also in the preferred form, the intermediate leading edge location is spaced vertically from the inner leading edge location by a distance of no greater than 2.5 inch, and no less than 0.5 inch, and is spaced rearwardly from the inner leading edge location by a distance no greater than 0 inch, and no greater than 1.0 inch. Within a narrower range, these distances are, respectively, no greater than 1.9 inch and no less than 0.9 inch for vertical spacing, and for the rearward spacing, no greater than 0.8 inch and no less than 0.3 inch.

Also in a preferred form, the outer leading edge location is spaced rearwardly from the intermediate edge location by a distance which is greater than 0.0 inch, and not greater than 1.5 inch. A narrower range is a dimension no less than about 0.4 inch, and no greater than about 1.0 inch.

Preferably, the outside leading edge location is positioned forwardly of a center location of its related upwardly facing primary support surface zone by a distance no greater than 2.2 inch and no less than 0.4 inch. A broader range is no greater than about 1.6 inch and no less than about 0.6 inch.

Other values of ranges of distances in angular relationships are given in the text of this patent application and are intended to be part of the subject matter of the present invention.

Other features will also become apparent from the following detailed description.

BRIEF DESCRIPTION OF THE DRAWINGS

FIGS. 20 and 20B are sectional views taken at lines 20A and 20B of FIG. 20.

DESCRIPTION OF THE PREFERRED EMBODIMENT

Figure 1:
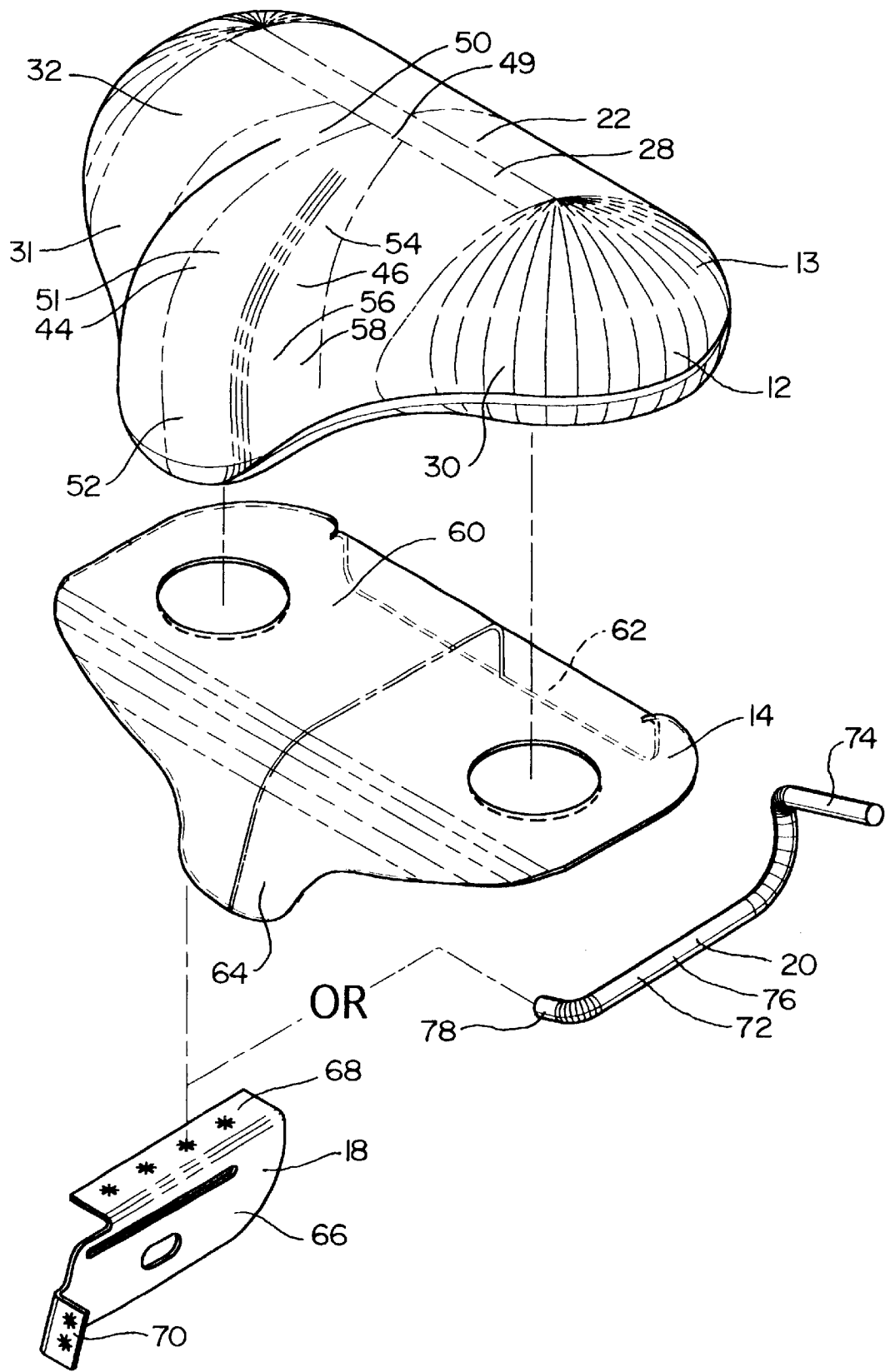
FIG. 1 is an isometric exploded view of the bicycle seat assembly of the present invention.

The seat assembly 10 of the present invention comprises a seat member 12, which comprises a main support section 13, a structural plate 14 that is fixedly attached to the lower side of the support section 13, and the mounting hardware 16. This mounting hardware 16 is shown as having two alternative forms, designated 18 and 20, respectively. The mounting hardware arrangements 16 (including both embodiments 18 and 20) are, or may be, conventional, so that the seat assembly 10 could be mounted to most bicycles which are in use today. These mounting arrangements 18 and 20 will be described more completely later in this text.

The seat member 12 has an upper surface 22 which can be described as a functional surface region, and which comprises main support surface region 24 and a center tactile surface region 26. The support surface region 24 is in turn made up of two surface portions, namely a main support surface portion 28 and a forward surface portion 30. The forward surface portion 30 can be considered as comprising a front surface portion 31 and an intermediate surface portion 32 positioned between the main and front surface portions 28 and 31. The center tactile surface region divides the forward surface portion 30 into right and left sections 33.

In describing the present invention, the seat assembly will be considered as having a center longitudinal axis 34 extending through the center of the seat in a forward to rear direction. Locations which are closer to the longitudinal center line 34 will be considered as having a "inner" or "inward" direction, and locations positioned further away from the center longitudinal axis 34 will be considered as having a "outer" or "outward" location. The seat assembly is symmetrical about the longitudinal axis 34.

The seat 12 has a leading edge line 36, which can be defined as the most forward edge of the seat member 12 as seen in plan view and which is immediately adjacent to the lower and front end of the forward surface portion 30. The line contour of this leading edge 36 is shown in front view in FIG. 10. To describe the contour of the leading edge 36, reference is made to FIGS. 2, 9 and 10. There are shown in all three of these Figures four leading edge locations, designated 36a, 36b, 36c, 36d.

Figure 9:
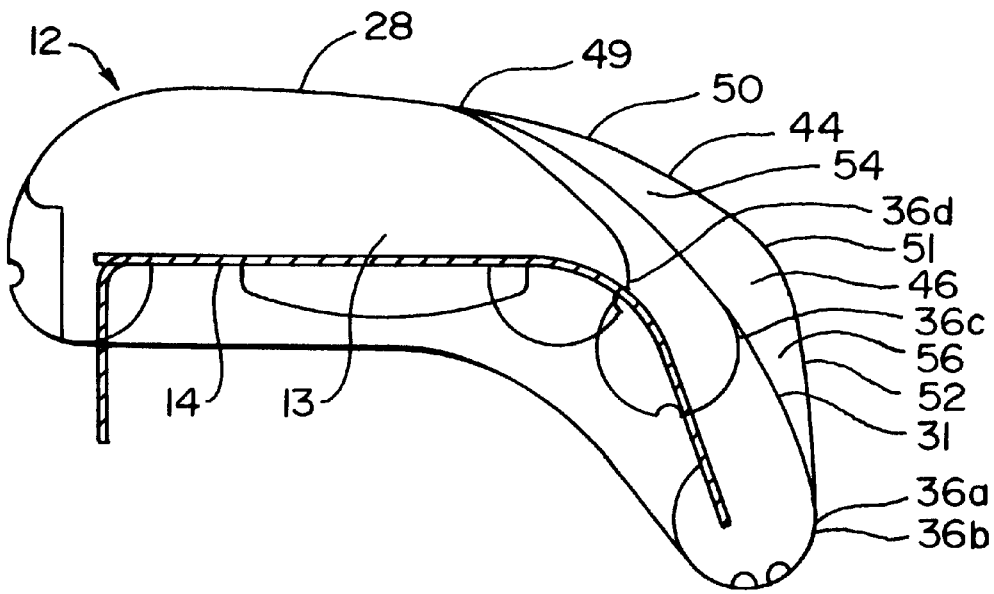
FIG. 9 is a side elevational view similar to FIG. 6, with the sections of FIGS. 7 and 8 superimposed thereon.
Figure 10:
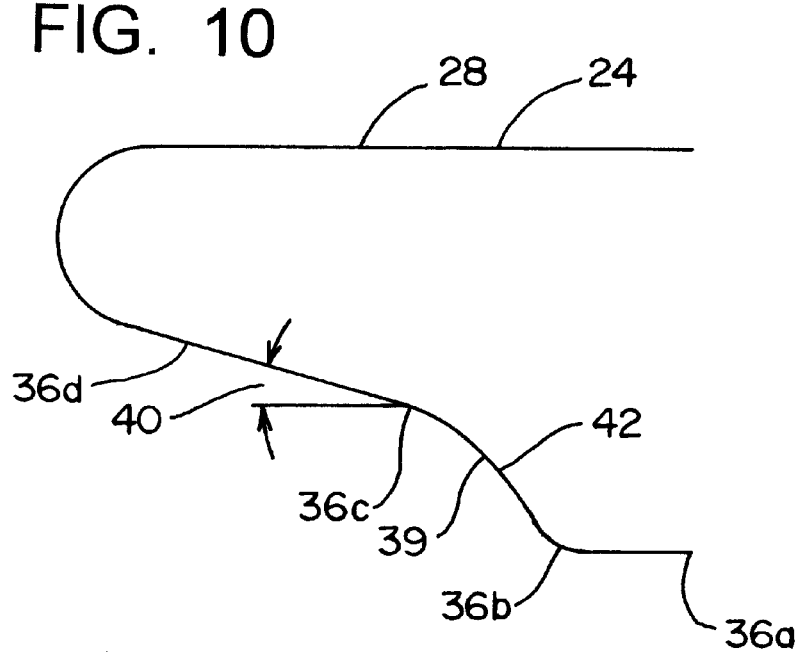
FIG. 10 is a schematic front elevational view of the leading edge of the seat member.

In the preferred embodiment of the seat, the lateral distance or spacing between points 36a and 36b is one inch; the lateral distance from point 36b to 36c is also one inch; and the lateral distance from point 36c to 36d is one and one half inch. Although only one side of the leading edge 36 is shown in FIGS. 9 and 10, it is to be understood the other side is similarly contoured. These "lateral distances" between the points 36a–36d are distances taken perpendicular to the longitudinal center line, and these are not the real distances since most of the portions of the leading edge extend in a slant from a transverse horizontal axis.

Figure 2:
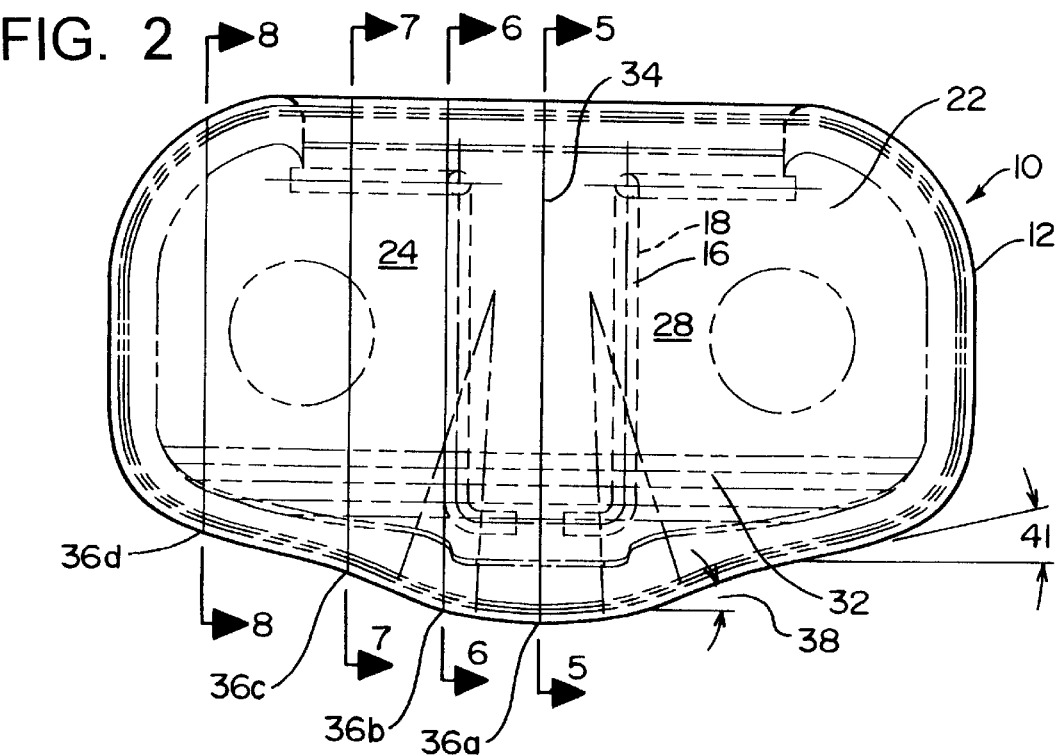
FIG. 2 is a top plan view of the bicycle seat assembly of FIG. 1.
Figure 3:
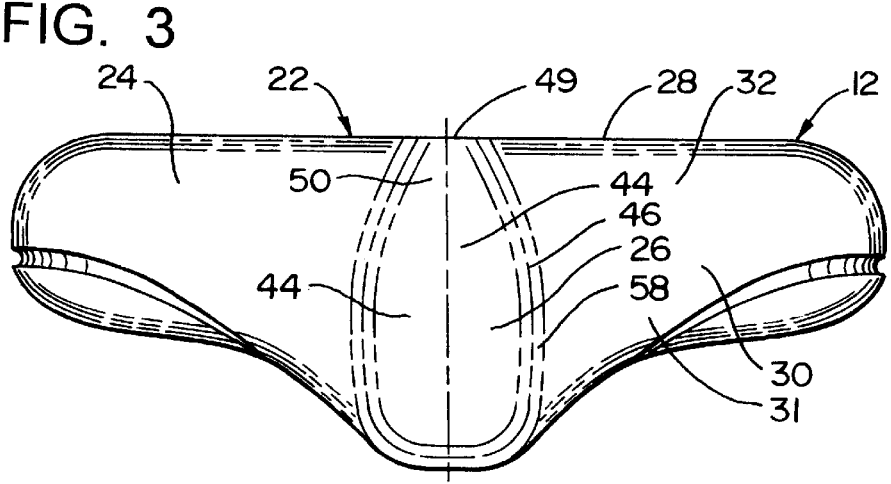
FIG. 3 is a front view of the bicycle seat that is shown in FIG. 1.
Figure 4:
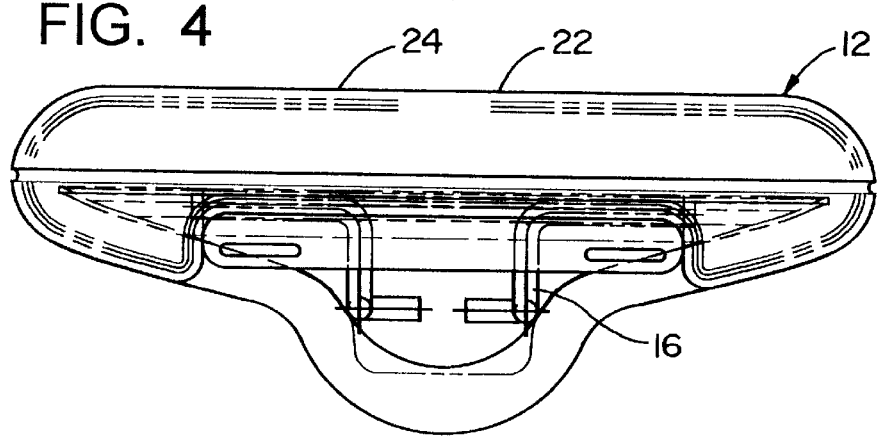
FIG. 4 is a rear view of the bicycle seat of FIG. 1.

The leading edge portion 36a to 36b can be termed the "center leading edge portion"; the leading edge portion from 36b to 36c can be considered the "inner transition leading edge portion"; and the front edge portion from 36c to 36d can be termed the "outer leading edge portion". Reference is now made to FIGS. 2 and 10, with FIG. 2 showing the contour of the leading edge 36 as seen in plan view (i.e. looking straight downwardly at the bicycle seat 12 this showing longitudinal and lateral spacing), and with FIG. 10 giving the contour looking at the bicycle seat from a forward direction (thus showing vertical and lateral spacing).

Figure 11:
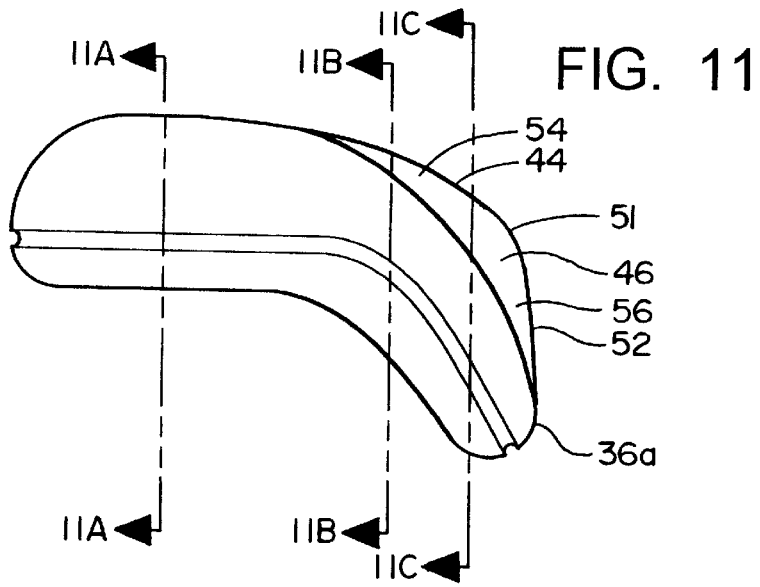
FIG. 11 is a side elevational view of the bicycle seat.
Figure 11A:
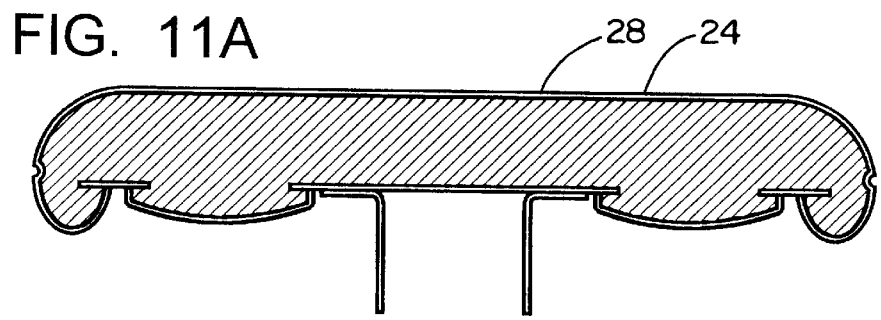
FIGS. 11A, 11B, and 11C are sectional views taken along, respectively, lines 11A, 11B and 11C of FIG. 11.
Figure 11B:
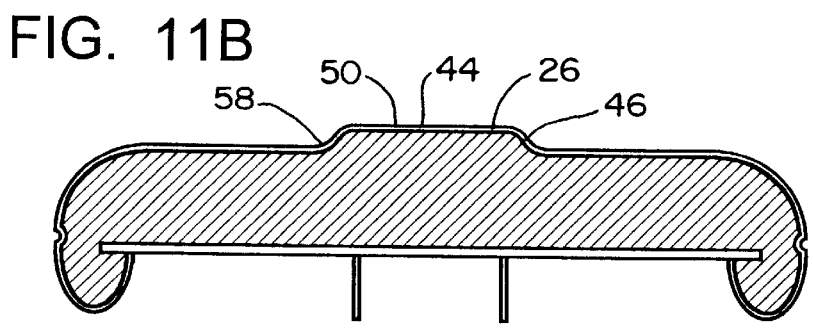
Figure 11C:
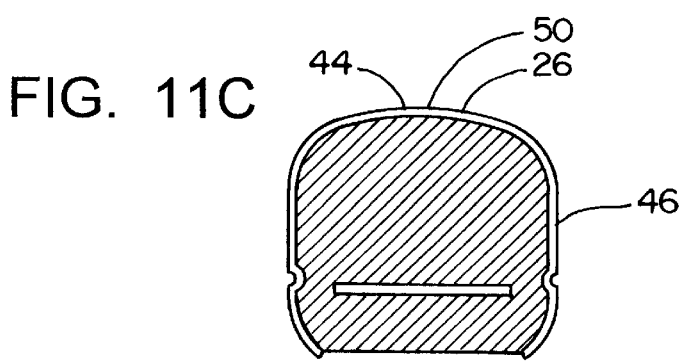

It can be seen that the central leading edge portion 36a–36b extends substantially laterally with little if any rearward or upward slant. The inner transition leading edge line segment from 36b to 36c has an outward and rearward sweep at an angle of approximately twenty degrees from a lateral orientation with this angle being indicated at 38 (see FIG. 2). The line segment 36b to 36c has a relatively steep vertical slant, as indicated in FIG. 10. A straight line drawn from 36b to 36c in the front View of FIG. 11 is a little bit greater than 45 degrees from the horizontal. The contour of the leading edge from the point 36b to 36c as seen from the front is indicated approximately at 39 and has a concave curve, with the inner portion of the contour is substantially steeper (i.e. about a third of a right angle or about 60 degrees) and becoming less steep as it approaches the point 36c.

The outer leading edge section (36c–36d) has a moderate slant both rearwardly and upwardly. In the view of FIG. 10, it can be seen that the upward slant is between about 15 to 20 degrees from the horizontal, this angle being indicated at 40 in FIG. 10, and the rearward slant indicated at 41 in FIG. 2 is at an angle of about 15 degrees.

The aforementioned center tactile surface portion 26 can best be seen in FIGS. 1 and 3, 9, 11, 11B and 11C. This tactile surface portion 26 comprises a centrally located upper and front surface portion 44 and two side portions 46. The surface portions 44 and 46 begin at an upper rear apex location 49. The upper and front surface portion 44 comprises a triangular shaped upper rear surface portion 50 which leads from the apex location 49 and increases in width in a forward and downward slant to an intermediate location 51. From the intermediate location 51 the upper and front surface portion 44 continues as a lower front surface portion 52 which is nearly vertical and terminates at the leading edge location 36a.

Each of the two side surface portions 46 comprises an upper rear portion 54, with the two portions 54 being on opposite sides of the upper rear surface portion 50, and lower forward side surface portions 56 which likewise terminate at the lower front leading edge location 36a. The two side surface portions 46 join to the adjacent forward surface portions 30 at a concavely rounded juncture location With reference to FIG. 1, it can be seen that the structural plate 14 has a main horizontal plate portion 60 with a rear downwardly directed mounting flange 62. Lights, storage bags, reflector or other items could be mounted to the flange 62. Then the plate 14 also has a forward central downturned portion 64 which in general matches the contour of the forward central portion of the seat member 12. This plate 60 is fixedly connected to the seat member 12, desirable by being attached during the molding operation, this can be done by conventional means and the plate openings 65 are provided for this purpose.

With regard to first embodiment 18 of the mounting hardware 16, the mounting device 18 has two parts, only one of which is shown at 66, which are mirror images of one another. This has a main vertically and longitudinally aligned plate 67, an upper horizontal connecting flange 68 and a forward connecting flange 70. As indicated above, this mounting device 18 is conventional.

The alternative mounting device 20 is also shown in FIG. 1 and has a pair of rod like members 72 having a rear horizontal end 74 an intermediate longitudinally aligned portion 76 and a forward inturned end 78. This also is or may be conventional.

Figure 12:
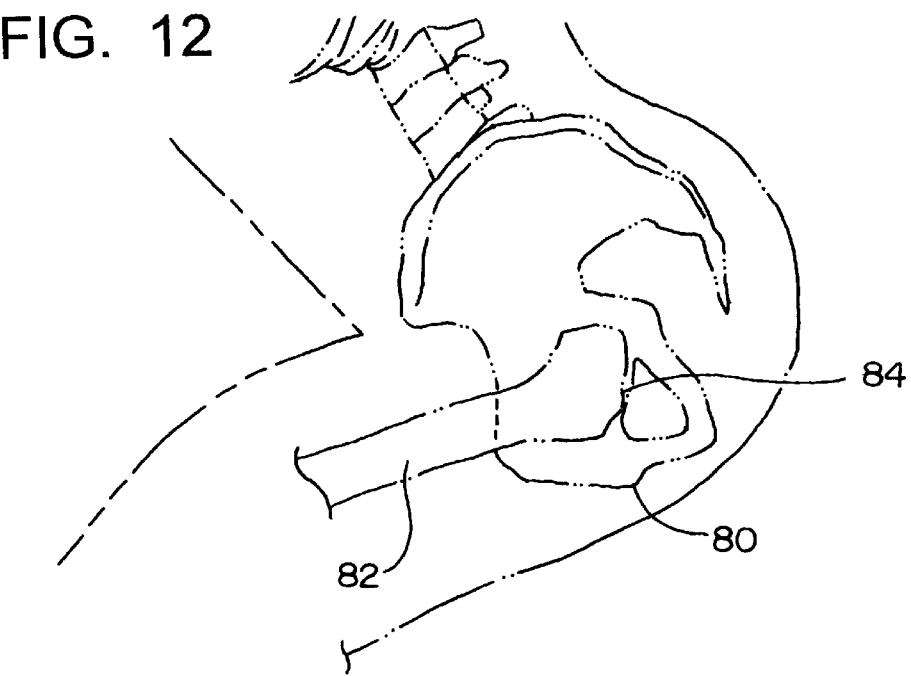
FIG. 12 is a side elevational view of the lower body and upper leg portions of a person, showing portions of the skeletal structure, with the body of the person being in a position that would be assumed in riding a bicycle in the seated pedaling position.
Figure 13:
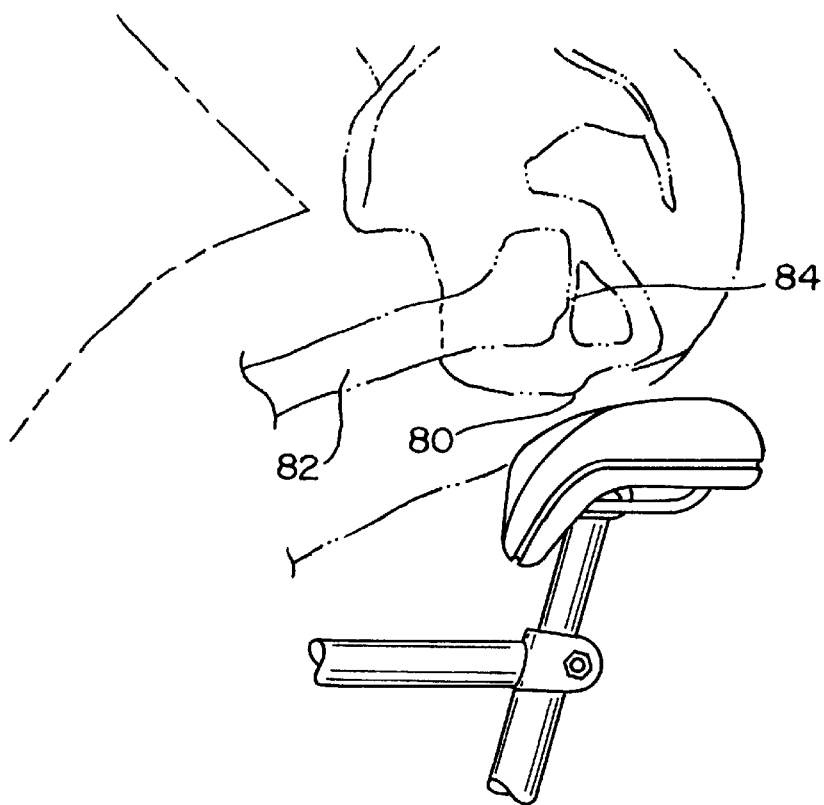
FIG. 13 is a view showing the human anatomy as in FIG. 12, but also showing the bicycle of the present invention, with the person being seated on the bicycle seat in the seated pedaling position.
Figure 14:
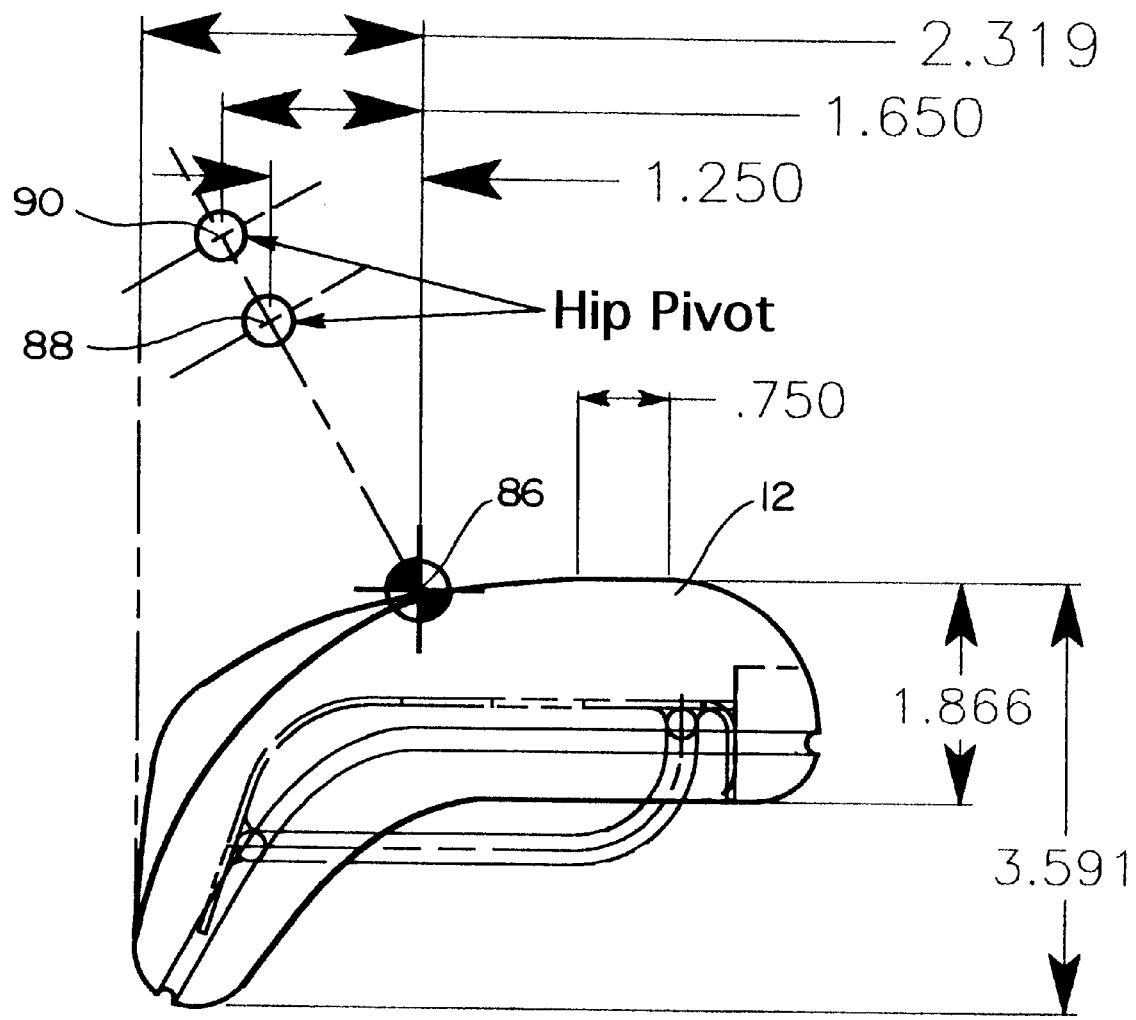
FIG. 14 is a view similar to FIG. 5, showing the bicycle seat in side elevation view, and showing two axes of rotation for the femur a person in the seated pedaling position, one being for a smaller person and the other for a larger person.

To describe the operation of the present invention, reference is first made to FIGS. 12, 13, 14 and 15. The two portions of the pelvis which are in load bearing relationship to the bicycle seat are the ischial-tuberosities indicated at 80 in FIGS. 12 and 13. In FIGS. 12 and 13, the femur 82 is shown, and point of rotation of the femur 82 is indicated at 84. With reference to FIG. 14, there is a bearing point or bearing location indicated at 86, and this would normally be the contact point at which each of the two ischial-tuberosities 80 bear against the bicycle seat 12 when the person is in the seated pedaling mode. The approximate location of the axis of rotation of the hip joint for a small female (5 foot two inches tall) is indicated at 88, and the axis of rotation of a large male (six foot two inches in height) is indicated at 90. It can be seen that the axis of rotation of the smaller female femur is 1.25 inches forward of the location of the ischial-tuberosities at 86, and the distance forward of the axis of rotation 90 for the larger male is 1.65 inches forward of the point 86.

The basic theory for providing a proper ergonomically and anthropometrically correct bicycle seat is to support the upper part of the human body with a seat that is configured to support the ischial-tuberosities at the base of the pelvis and the fleshier part of the buttock gluteus-maximus. This distributes the body weight across a greater area and provides a more conventional seating posture found in other seating devices. It also protects the genitals and other tissue from chafing, blistering, bruising and potential injury.

The main support portion 13 of the bicycle seat 12 itself is made of a cushion-like foam material, covered by durable plastic outer cover or shell. In accordance with the ASTM standard, this material has an indentation load deflection (ILD) of about 45 to 48, this provides the desired firmness, yet is sufficiently yielding to be comfortable. Within a broader range this ILD could be between 42 to 48, or possibly 40 to 50.

As indicated earlier in this text, there are a number of interrelated factors which relate to the proper design of a bicycle seat. The design should be such that it can enable the cyclist to function in three modes of operation. To review this briefly, first there is the usual seated pedaling position, which is shown in FIG. 13. Second, there is the coasting position, where the cyclist is positioned on the seat 12, but is not pedaling. Then there is the standing pedaling position where the cyclist raises himself up in the seat so that the buttocks are several inches above the level of the seat (i.e. out of contact with the seat), and the cyclist is pedaling.

Also, the seat should be designed to be optimized with regard to a number of factors. First, the seat must be designed to give proper support to the cyclist during both the seated pedaling position and also the coasting position. Second, the seat should be designed to that the cyclist is automatically properly positioned relative to the bicycle. Third, the seat should provide for the comfort of the cyclist in all operating modes. Fourth, it should be designed to provide proper "clearance", and "mobility" which means that the seat is designed so that it permits the cyclist to properly position himself for all three operating modes (i.e. seated pedaling position, coasting position, and standing pedaling position) and also to permit the cyclist to perform the proper movements in the two pedaling modes.

All of these factors are inter-related. The manner in which the present invention satisfies these requirements quite effectively will now be described.

As indicated above, the seat, as it is being used by the cyclist in the seated pedaling position, is shown in FIG. 13. The cyclist would normally be positioned so that the ischial-tuberosities 80 of the cyclist would be located at a more forward location of the main support surface 28. With reference to FIG. 14, this location is indicated at 86, and is about 2.3 inches rearwardly of the most forward part of the seat.

This bearing point of the ischial-tuberosities is at an area where it is sufficiently close to the forward support surface portions 30 to permit the person's legs to operate properly in the pedaling motion, and also have the ischial-tuberosities resting on a slope of the bearing surface which is not at a forward slant so as to diminish its ability to provide proper vertical support. In this position, the center surface portion 26 is positioned between the person's legs. This surface 26 does very little to bear the weight of the person's body. Rather it provides tactile support for centering the person in a manner that it does not put any pressure and/or rub the genital areas of either the male or the female rider. The side surfaces 48 of the raised center surface portion 26 place the person in the proper center position with the legs resting opposite sides of the raised center portion 26.

It has been found that in accordance with the present invention the contouring of the forward support surface portion 30 on opposite sides of the raised center portion 26 provide support for the rider, and also satisfies the clearance and mobility requirements for cyclist in the seated pedaling position. The contouring of the leading edge 36 and forward surface support portion 30 are particularly critical in accomplishing this. It will be recalled that earlier in this text, with reference to FIGS. 2, 9 and 10 that each of the leading edge portions 36b–36c rises rather sharply, and also has a rearward slant. Then at each of the leading edge sections 36c–36d there is both a moderate rearward and outward slant and a moderate upward and rearward slant. It has been found that this contouring contributes to the support of the person and also enables sufficient clearance to permit the seated pedaling motion.

Also the upper rear inside muscular portions of the person's thighs that are positioned adjacent to the side walls 48 of the upper contact portion 26 come into contact with the inner portion of the two front surface portions 30 when the person is moving the leg downwardly in the pedaling stroke, and this provides some support. At the same time, when the other leg is being raised, it is coming out of bearing engagement with its related front inner portion of the bearing surface portion 30. Thus, either one or the other of the person's legs that is in a further down position is actually supporting some of the person's weight, and at the intermediate position where both of the legs are at about the same position, both of the inner forward portions of the surface portions 30 can also contribute to bearing the weight, depending on the physical characteristics of the person. At the outer parts of the forward surface portions 30, the leading edge portions 36c–36d are slanted further rearwardly and also upwardly so that these provide greater clearance. This more closely matches the contouring of the upper rear portion of the person's thighs and also provides some support.

It has been found with this particular contouring of the forward surface portions of the seat assembly 10, the cyclist is seated comfortably and securely in the seat 12 and has sufficient clearance so that the pedaling stroke can be properly executed.

Let us now examine the operation of the present invention in the coasting position. This would occur, for example, when the person is coasting downhill and the person simply wants to rest on the seat 12 without pedaling. To accomplish this, the person would normally slide a short distance rearwardly on the bicycle seat so that the ischial-tuberosities would be positioned more rearwardly so that a greater area of the person's buttocks and upper rear thigh portions would be supported by the main surface support portion 28.

When the cyclist wishes to return to the pedaling position, the cyclist simply slides forward a short distance on the seat member 12 to a position where the cyclist can comfortably execute the pedaling motion. The precise position of the cyclist will depend upon a number of factors. For example, a more muscular person with greater muscle mass in the buttocks and rear thighs would likely be positioned so that the ischial-tuberosities of the cyclist are somewhat more forward. On the other hand if the cyclist is a much thinner person with less muscle mass, that person may be positioned in possibly a slightly more rearward position. As indicated above, it has been found that the person will very quickly automatically finds his or her most comfortable seating position and return to it almost automatically without giving it any thought during the actual cycling operation.

In the third cycling position (where the cyclist is standing up on the pedals and pedaling), the person's buttocks are totally off the seat member 12. It has been found that when the person is moving his leg to the furthest downward position, the back of the thigh would be positioned in a more outward location, namely near or possibly laterally outside of the leading edge portion 36c–36d. As the cyclist then pushes down with the upwardly positioned foot, the shift in applied force causes the cyclist to move the upper part of the bicycle to the opposite side. It has been found that the contouring of the leading edge 36 enables the cyclist to operate in the stand up pedaling position without uncomfortably bumping the rear portion of the thighs against the bicycle seat.

To explore other facets of the geometry of the present invention, one of the significant benefit of the present invention is that it is designed to accommodate a wide range of different body builds, in that it will function effectively for about 95% of the adult population in the United States. A female who is about 4 feet 11 inches tall would on the average have her ischial-tuberosities spaced 6.4 inches apart. A male who is 6 feet 4 inches tall would, on the average, have his ischial-tuberosities spaced from one another by about 7.4 inches apart. About 95% of the adult population would be in this range.

Thus, with the two ischial-tuberosities being the centers of the primary support locations, the primary support locations would be positioned on opposite sides of the longitudinal center axis 34 and spaced therefrom by a distance of between about 3.2 to 3.7 inches, and in any case no less than about three inches and no greater than about four inches.

Figure 15:
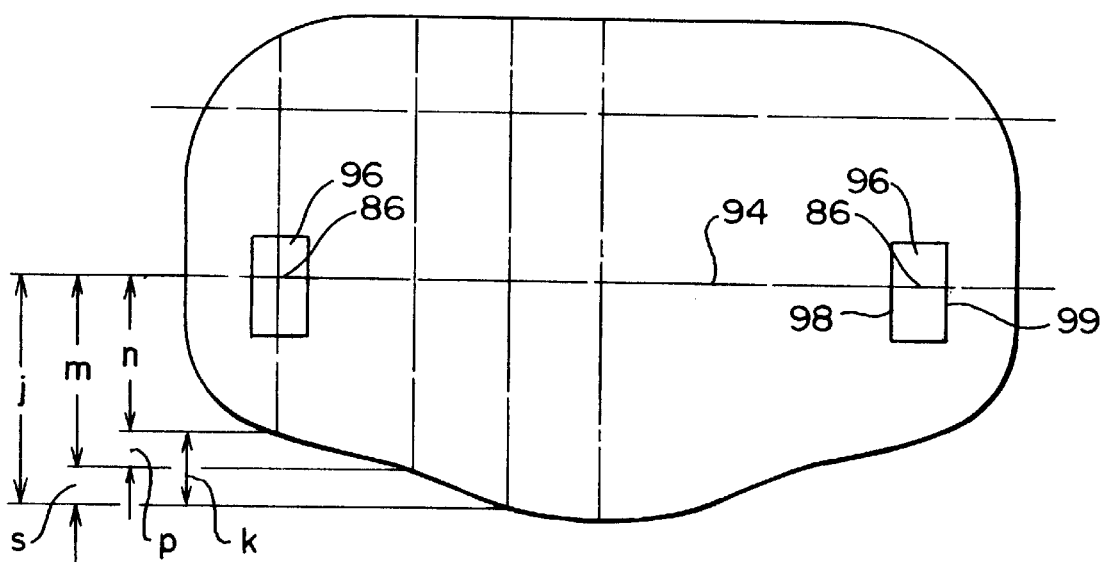
FIG. 15 is a view substantially the same as FIG. 2, except that the numerical designations are not included in FIG. 15, and various dimensions are shown.
Figure 16:
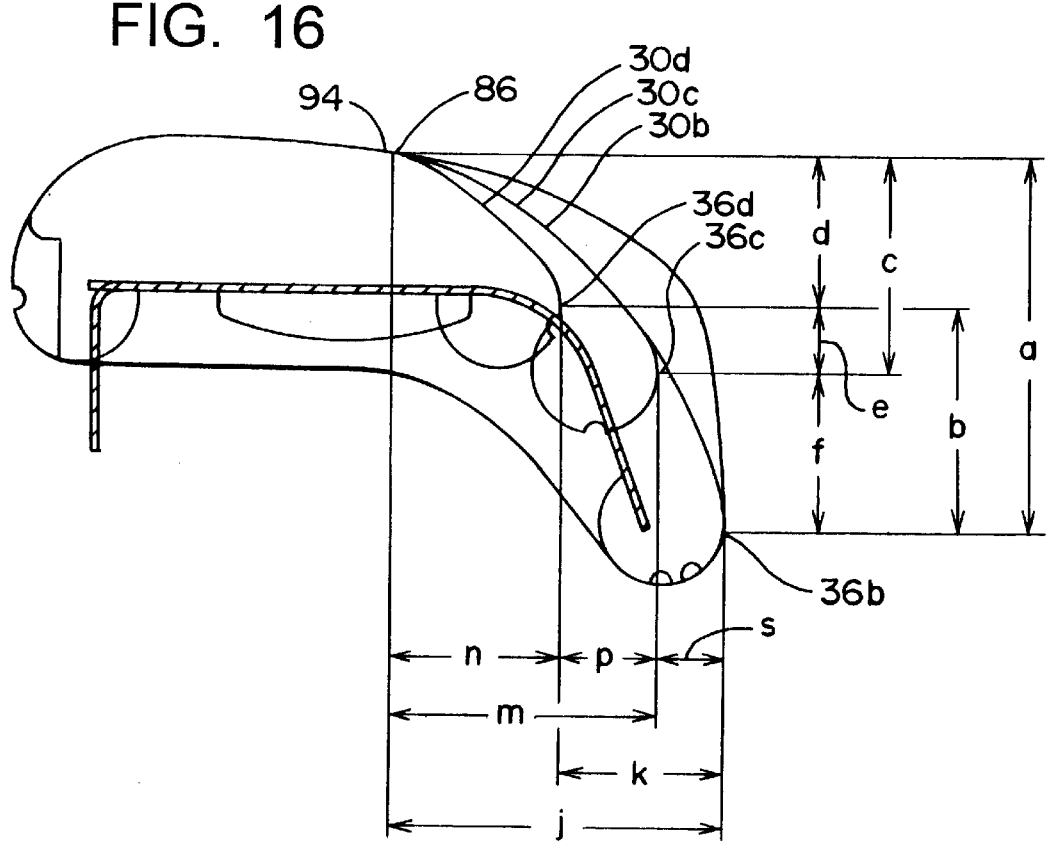
FIG. 16 is a view substantially the same as FIG. 9, but showing various dimensions.

With regard to the forward to rear location of the primary load bearing locations, as shown in FIG. 15, the two median support locations are shown at 86 in FIG. 16. The transverse transition line (which can be termed a primary load support line) of the main rear support portion 28 and the forward support portions 30 passes through these points 86 and is designated 94. Obviously, as indicated previously in this text, this line 94 is not a precise location primarily because of the differences in body structure of the riders. Further, this could also depend upon the particular riding style.

For example, a more aggressive rider may be positioned further forward so that his ischial-tuberosities are positioned further forward and thus on more of a slope. In the seated pedaling mode, the person would be pushing downwardly with either one leg or the other most all of the time, and the cyclist in a more aggressive position may feel that having his body in this more forward position would better enable for him to apply greater force to the pedals. A cyclist who is seated and pedaling in a more relaxed mode may prefer to be further back on the seat so as to be resting on a more level section of the bicycle seat. Also, as indicated previously, the forward to rear positioning of the persons ischial-tuberosities will depend to some extent on whether the person is rather thin, with smaller thighs or has rather large thighs.

In FIG. 15, there are shown at 96 two rectangles defining the zone 96 in which the center of the primary support locations would normally be situated. The lateral limits of these are one-half inch in width and are indicated at 98 and 99 (to locate the inside and outside positions of the center support of the ischial-tuberosities) and no greater than about one inch in width. The inside limit 98 is for the small person and the outside limit 99 for the larger person. The forward to rear limits 100 and 104, respectively, are given as being one-half inch forward and rear of the median line which is the transverse primary load support line 86.

Figure 6:
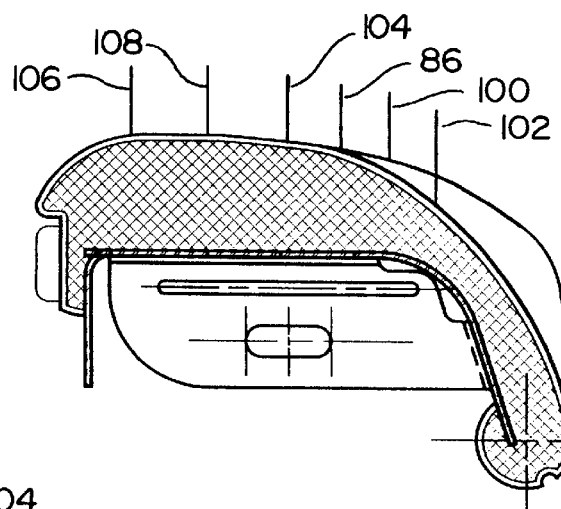
FIG. 6 is a longitudinal sectional view taken along line 6—6 of FIG. 2.
Figure 7:
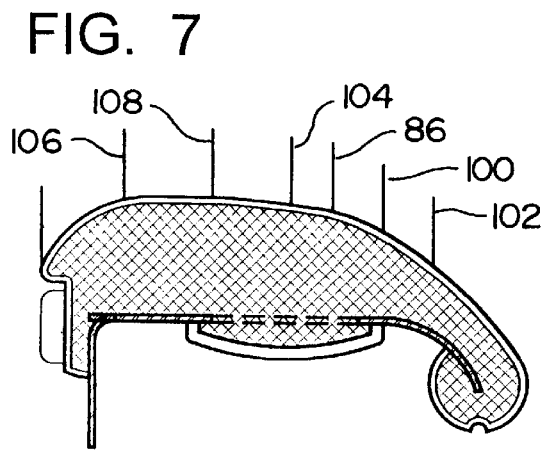
FIG. 7 is a longitudinal sectional view taken along line 7—7 of FIG. 2.
Figure 8:
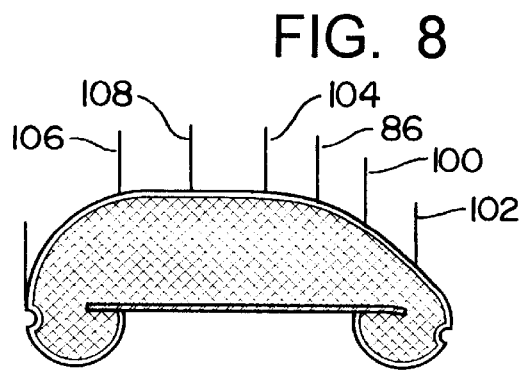
FIG. 8 is a longitudinal sectional view taken along line 8—8 of FIG. 2.

With reference to FIGS. 6, 7 and 8, if the person moves one-half inch forward from the median position so that the ischial-tuberosities are centered at the location 100 at the locations of the cross sections of FIG. 6, the ischial-tuberosities are clearly resting on a downward slope between 30 to 40 degrees from the horizontal (see FIG. 8), but the inner thigh portion would still have an area of support contact at 30 (see FIGS. 6 and 7). If a person is still seated and pedaling very aggressively, that person may move yet further forward to the location at 102. Here the rear thigh portion of the person would still make contact with the front support portion, but this contact would be at about approximately a 45 degree angle. Yet there would still be some contact and support at inner locations (see FIGS. 6 and 7).

Therefore, it can be surmised that for a person to pedal in the seated position at a comfortable pace where the person would feel reasonably secure on the seat without slipping forward, the ischial-tuberosities would be at the location of the transverse line location 86. If the person could move back to the transverse line 104 (about a half-inch back from the line 86), depending upon the person's physique (i.e. if the person has relatively thin thighs) this may be a quite comfortable seated pedaling position.

When the person moves from the seated pedaling position back to the seated cruise position it is also apparent that when the ischial-tuberosities are located more rearwardly of the line 106, or to an intermediate line 108, the support surface is level and the person will be in a comfortable and secure position.

Another factor which will affect the positioning of the person on the seat is that the seat could be tilted so as to have more of a downward and forward slant or an upward and forward slant, and moved to different elevations.

Figure 5:
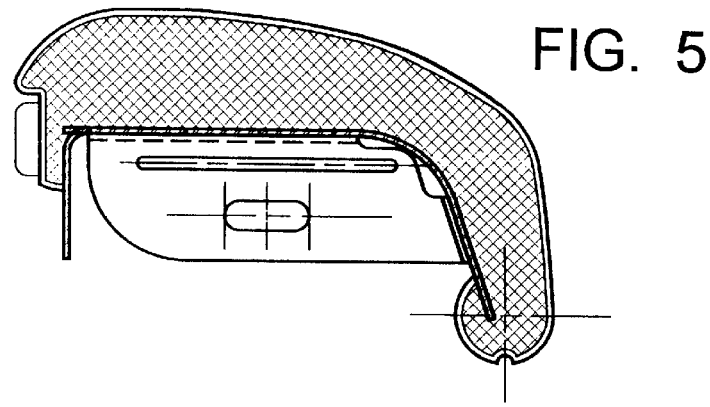
FIG. 5 is a longitudinal sectional view taken along line 5—5 of FIG. 2.

As indicated previously, FIGS. 5 though 11 have been drawn to scale, and the contours and positions shown are drawn to accurately present the seat contours of the preferred embodiment of the present invention. It is obvious that various modifications could be made to the present invention without departing from the basic teachings thereof. Also there can be departures from the exact contours shown. The precise contouring depends upon various factors, such as the anatomy of the cyclist and other factors. With regard to angular relationships, the horizontal angle 38 of the section 36b to 36c could conceivably be in a broad range between 5 degrees and 40 degrees, and as shown herein about 20 degrees more desirably between 10 to 30 degrees, yet more desirably between 15 and 25 degrees. The vertical alignment of the leading edge inner portion 36b–36c is desirably about one half of the right angle, and within the broader scope could be between 25 to 75 degrees. More desirably, this would have a lower limit of 35 or 40 degrees and a higher limit of between 55 or 70 degrees. Also, it is to be understood that the contour between the points 36b and 36c would likely be concavely curved as indicated in 42 to match the contour of the adjacent portion of the thigh of the cyclist.

The angle 41 of the outer leading edge portion 36c–36d could within the broader range be between 5 degrees to 30 degrees and more desirably be between 10 to 25 degrees and more desirably about 15 degrees or possibly between 15 to 20 degrees. The vertical angle 40 is desirably 15 degrees to 20 degrees and within the broader range would be no greater than 40 degrees or 30 degrees and no less than 5 degrees or 10 degrees.

The front to rear dimension of the main support portion 28 of the seat is desirably approximately two inches or more, and could be made longer.

In the seated pedaling mode, very little of the person's weight actually rests on the rear part of the main support back surface portion 24, and this back part of the surface portion 24 supports more of the person's weight during the coasting mode of operation. It has been found adequate to make this rear surface portion 24 two to three inches. To increase this front to rear dimension beyond this would normally not have any benefit in providing support.

With regard to the forward support surface portion 30, the outer section 36c–36d should be contoured to provide sufficient clearance for the cyclist in both the seated pedaling mode and the stand up pedaling mode. Yet it is desirable to have a certain amount of surface support during the seated pedaling mode. It can be seen in FIG. 9 that between the two leading edge points 36c and 36d there is still a reasonable amount of support surface at the forward surface portions 30 (i.e. laterally between locations 36b and 36c).

To analyze further the practical effects of the more forward or more rearward positioning of the ischial-tuberosities of the cyclist, reference is made to FIGS. 5, 6, 7 and 8. For clarity, the numerical designations for the various features have been omitted, and instead of this there have been shown various locations related to the changes in the forward to rear positioning of the person's ischial-tuberosities.

It was indicated earlier that the numerical designation 86 indicates the forward to rear location of the two ischial-tuberosities in what might be called the median position which is at the transition line of the main support surface portion 28 and the forward surface portion 30.

It will be recalled that the sectional view of FIG. 6 is taken at a lateral location about one inch away from the longitudinal center axis; the section at FIG. 7 is two inches away from the longitudinal axis 24, and the section taken at FIG. 8 is three and one-half inches distance from the longitudinal axis 34. The two primary load bearing zones 96 have a width limit at the location 3.2 inches from the longitudinal center axis and 3.7 inches from the longitudinal axis. Thus, the section taken at FIG. 8 extends through (and is almost centered on) the primary support zone.

To further describe the relationships of the functional portions of the seat of the present invention, reference is made to FIGS. 15 and 16. The selected reference locations are the support locations 86 and the transition line 94 which extends through the two point locations 86, and the three leading edge locations 36b, 36c and 36d.

There is a longitudinal axis 34, a central vertically and longitudinally aligned reference plane, and two sets of three additional longitudinally and vertically aligned reference planes on opposite sides of the center reference plane. More specifically, for each of the right and left portions of the seat, there is a second reference plane which is positioned immediately outside of the lateral support surface 48 of the center surface portion 26, and in this embodiment is about one inch from the longitudinal axis 34.

There is a third reference plane which is at an intermediate location about two inches from the longitudinal axis, and a fourth longitudinally and vertically aligned reference plane which is three in a half inches from the longitudinal axis 34.

At each of the second, third and fourth reference locations, there can be considered to be, respectively, the following:

a) a second support surface inner location at which there is an inner leading edge location and an inner support surface contour;

b) at the third reference plane location there is an intermediate leading edge location and an intermediate support surface contour;

c) a fourth outer support surface outer location at which is located an outer leading edge location and an outer support surface contour.

With the foregoing explanation being given as to the location of these reference contours and locations, it will be noted with reference to FIGS. 15 and 16 that the three leading edge locations are shown (at 36b, 36c and 36d) and also the related surface contours at 30b, 30c, and 30d. It can be seen that the six vertical spacing distances between these four locations are indicated in FIG. 16 and are indicated at a, b, c, d and f. The longitudinal spacing distances are given in both FIGS. 15 and 16, these bearing the letter designations j, k, m, n, p and s.

As indicated previously, many of the figures in these drawings are drawn to scale, and FIGS. 15 and 16 are both drawn to scale, this being approximately two-thirds of the size of a full bicycle seat. The numerical value in inches for these various dimensions are given in the table below.

While these dimensions are being given down to the hundredth of an inch, it is to be recognized that an actual seat built to incorporate the present invention would not need to be built in such close tolerances. The prototype design finally arrived at in the present invention has had its dimensional relationships and contours carefully selected to provide a seat which is intended to satisfy the requirements of the 95% of the U.S. adult population. Obviously, there can be deviations from this, and further there could be specialized deviations where the bicycle seat could be designed for perhaps the upper 50% of persons in size and the lower 50%. Further refinements could be made.

Therefore, in accordance with the present invention, tolerances are given for each of these relative dimensions, and this is done in the following table.

| Preferred Dimension in Inches | | Possible Upper Limits | Possible Lower Limits |
| --- | --- | --- | --- |
| a) | 2.96 | 5.0, 4.5, 4.0, 3.5, 3.2, 3.0 | 2.9, 2.7, 2.4, 2.0, 1.5 |
| b) | 1.76 | 3.5, 3.2, 2.9, 2.6, 2.3, 2.1, 1.9, 1.8 | 1.7, 1.5, 1.2, 0.9, 0.5 |
| c) | 1.69 | 3.5, 3.2, 2.9, 2.6, 2.3, 2.0, 1.8 | 1.6, 1.5, 1.3, 0.9, 0.5 |
| d) | 1.20 | 2.5, 2.2, 1.9, 1.6, 1.4, 1.3 | 1.1, 0.9, 0.7, 0.5 |
| e) | 0.49 | 1.0, 9.0, 8.0, 6.0, 5.5 | 4.5, 4.0, 3.0, 2.0, 1.0 |
| f) | 1.27 | 2.5, 2.2, 1.9, 1.6, 1.3 | 1.2, 1.1, 0.9, 0.7, 0.5, 0.3 |
| j) | 2.31 | 4.5, 4.0, 3.5, 3.1, 2.8, 2.6, 2.5, 2.4 | 2.2, 2.1, 1.9, 1.6, 1.2 |
| k) | 1.25 | 2.5, 2.2, 1.9, 1.6, 1.4, 1.3 | 1.2, 1.1, 0.9, 0.7, 0.5 |
| m) | 1.81 | 3.5, 3.2, 2.9, 2.6, 2.3, 2.1, 1.9 | 1.7, 1.6, 1.4, 1.1, 0.8 |
| n) | 1,06 | 2,2 m 1,9 m 1.6, 1.4, 1.2, 1.1 | 1.0, 0.9, 0.8, 0.6, 0.4 |
| p) | 0.75 | 1.5, 1.3, 1.1, 1.0, 0.9, 0.8 | 0.7, 0.6, 0.5, 0.4, 0.3 |
| s) | 0.50 | 1.0, 0.9, 0.8, 0.7, 0.6, 0.55 | 0.45, 0.4, 0.35, 0.3, 0.25, 0.2 |

In the above table, there are values greater than the designated value in the preferred embodiment, and it is to be understood that within the broader scope of the present invention, in some configurations it would be possible to have these dimensions made larger, up to these values. With regard to the values which are below the value given in the preferred design, and in some configurations it would be possible to have lesser values down to some of these lesser values. Obviously, since all these dimensions are interrelated, the change of one or more of these dimensions would in general be accompanied by changes in other of these dimensions.

Figure 17:
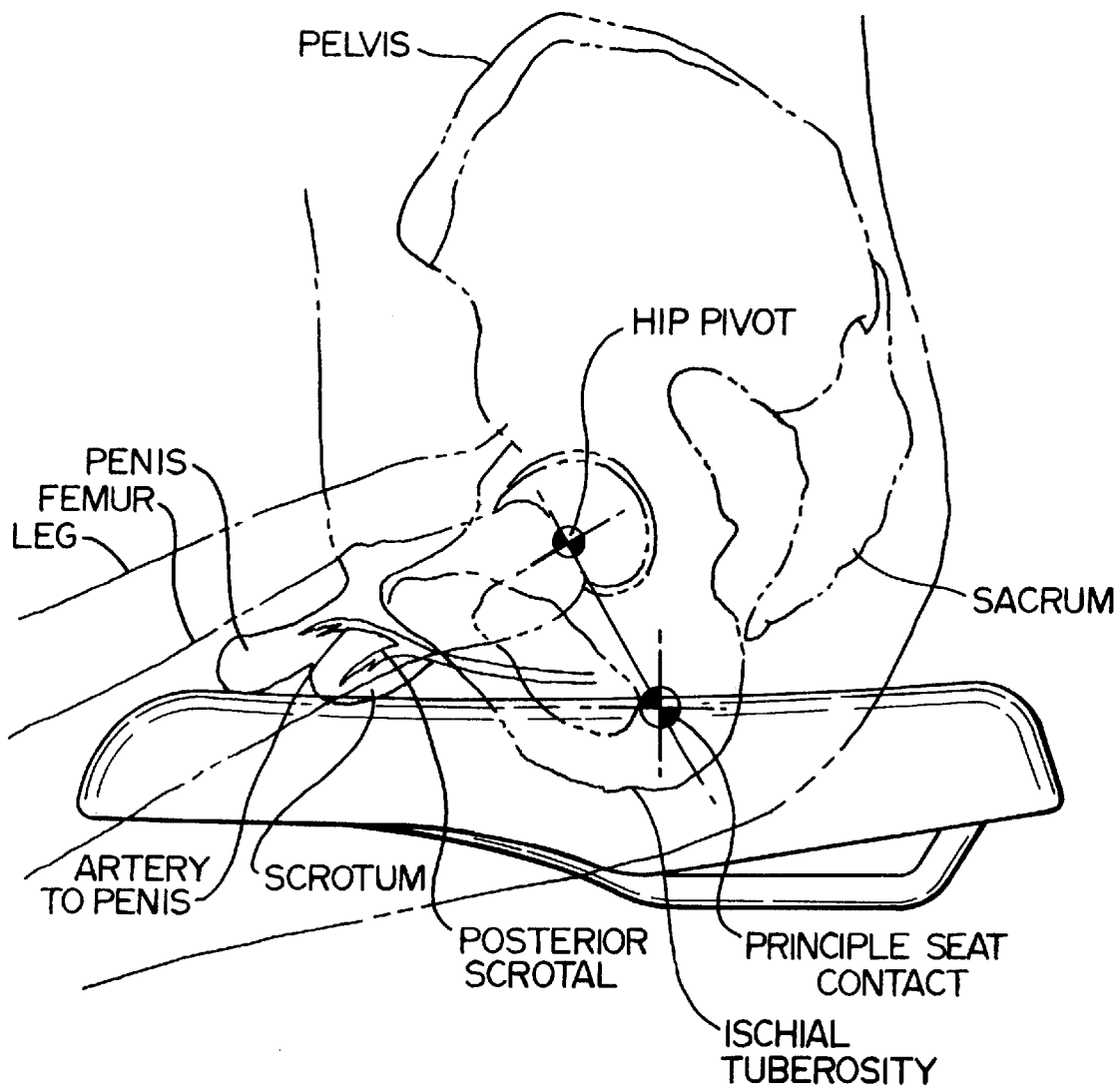
FIG. 17 is a somewhat schematic side elevational view showing portions of a person's anatomy where the person is seated on the conventional saddle seat.
Figure 18:
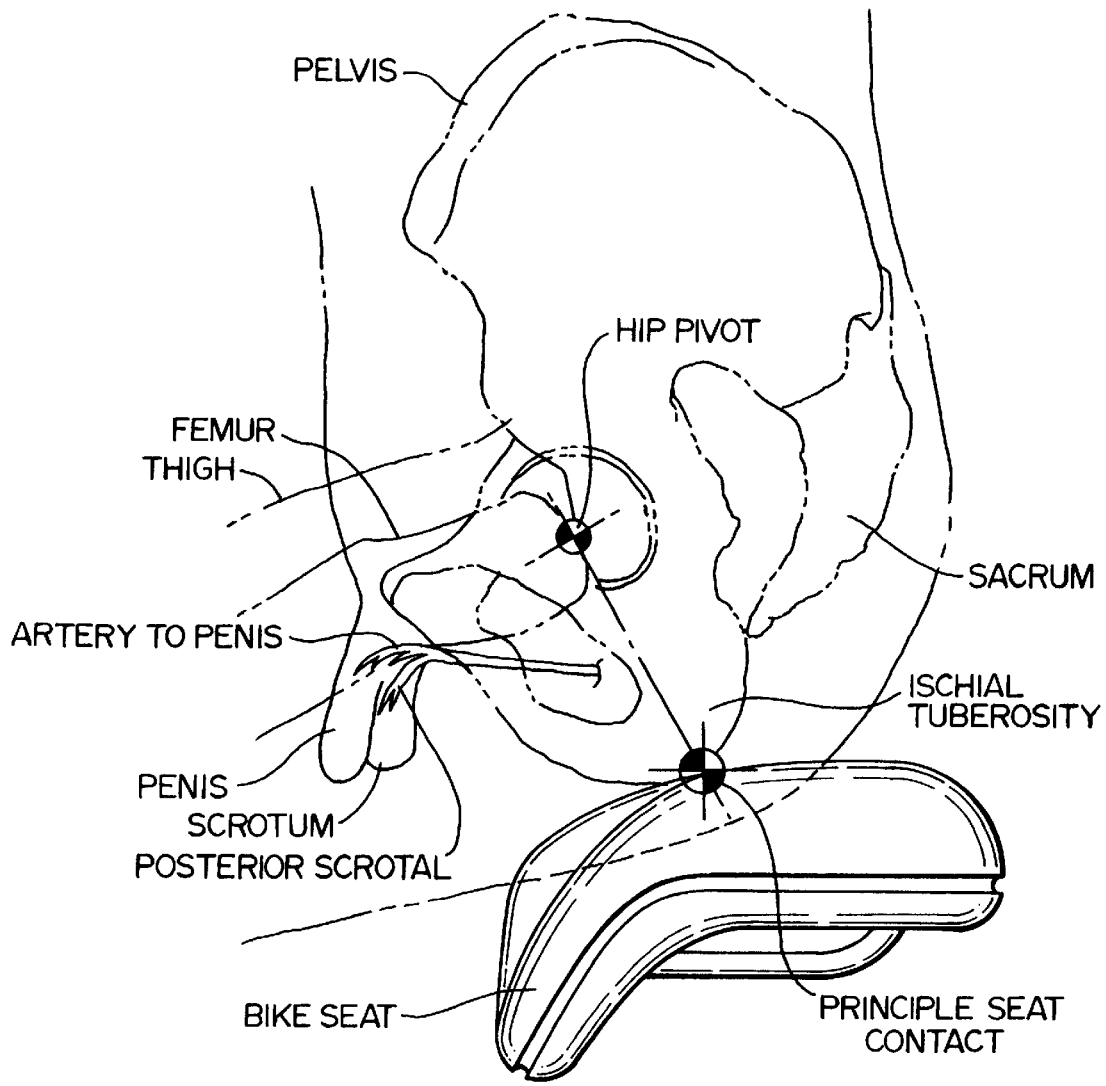
FIG. 18 is a view similar to FIG. 17, but showing the person seated on the bicycle seat of the present invention in the seated pedaling position.
Figure 19:
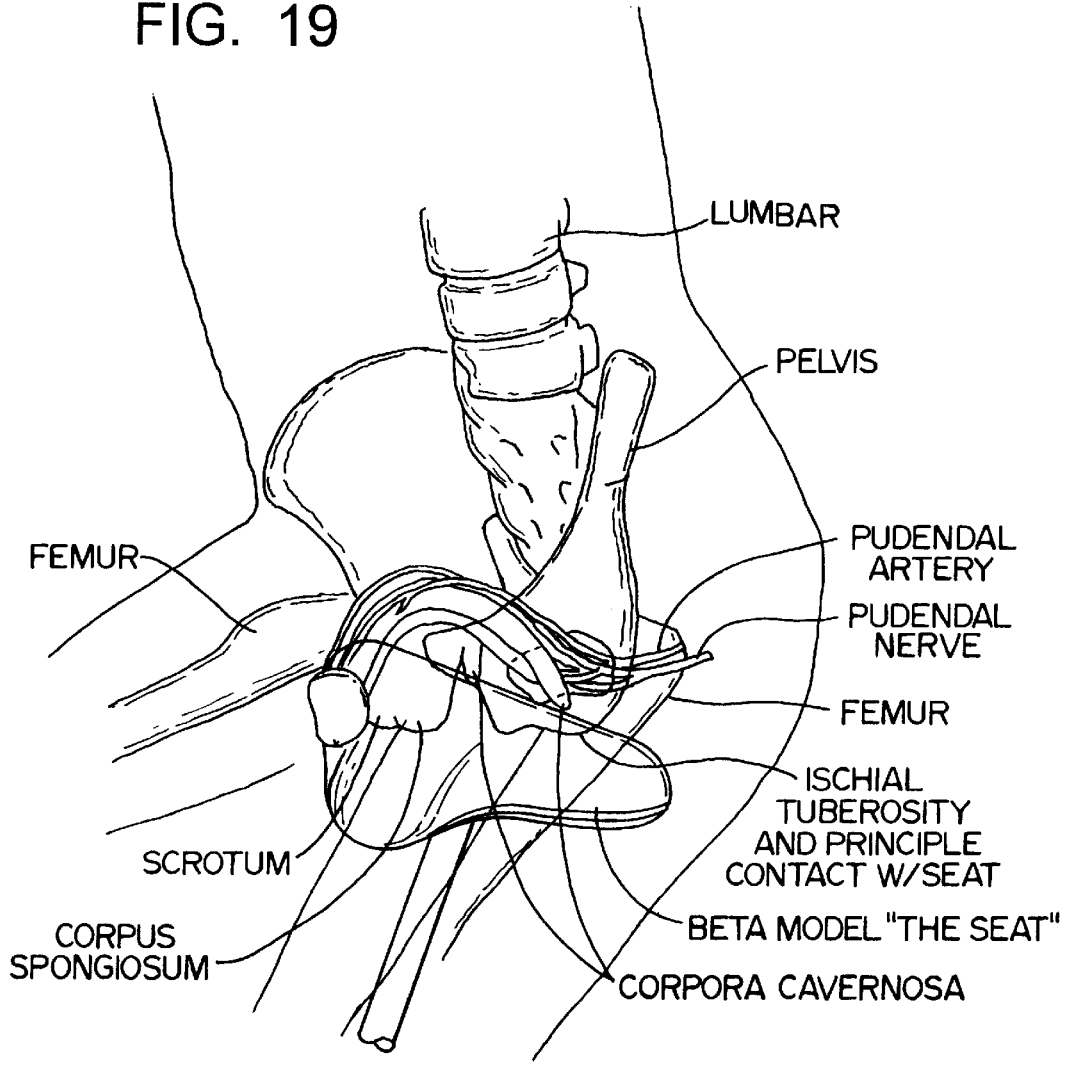
FIG. 19 is an isometric view showing the middle anatomy portions of a person's body, seated on the bicycle seat of the present invention.

FIG. 17 is a side elevational view illustrating the male anatomy where the person is sitting on one of the prior art saddle seats. As a comparison, in FIG. 18 there is a view similar to FIG. 17, but showing a male person sitting on the bicycle seat of the present invention. In FIG. 19, the person is seated on the present invention, but this is a perspective view. This illustrates more graphically the effectiveness of the present invention relative to hygienic safety.

Figure 20:
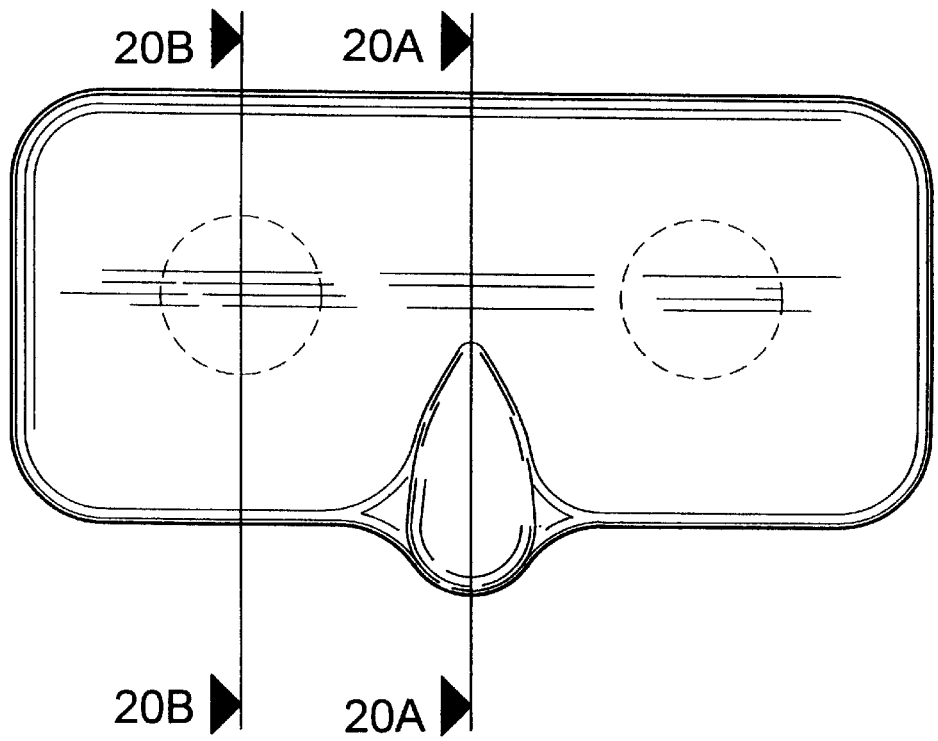
FIG. 20 is a top plan view of the prior art bicycle seat shown in the aforementioned design patent then DES 348,758.
Figure 20A:
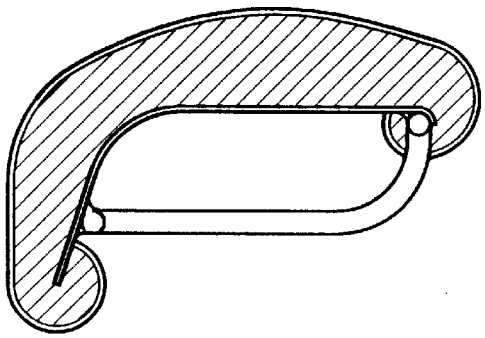
Figure 20B:
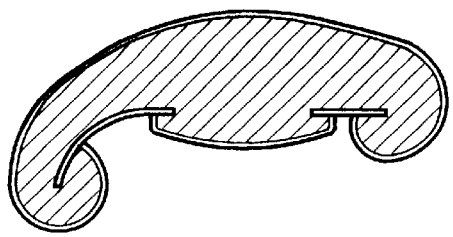

Also, in FIGS. 20, 20A and 20B there are three views of the prior art seat shown in the design patent application of the present inventor mentioned previously herein. The tactile center portion is shown in FIG. 19B, and the section across the seat is shown in FIG. 19A. It can be seen that the section 19A is substantially uniform across the entire width of the seat, until it reaches the lateral side end portions, where there are rounded curves.

The seat assembly 10 of the present invention has been designed so that it is compact and light. Obviously, in some of the areas which are not critical to the support of the person, the dimensions of the seat could be extended, or otherwise modified. For example, at the rear of the seat there could be appendages to accomplish various other functions. It would be possible to add to the width of the seat, but this would normally not provide any advantage, and in fact would possibly be something of an obstruction when a person is getting on and off the bicycle. Further, the lower front center portion could be extended. However, in general there would be no advantage in doing so.

Also, as is apparent from the above text, the various dimensional, angular and contour relationships that are given are to adapt the seat to the human body. It would be possible to customize the seat of the present invention to some degree, and depending on the person's physic, there may well be derivations from these relationships given herein. However, it is intended that the scope of the present invention would be interpreted sufficiently broadly to cover these.

Therefore, I claim:

1. A bicycle seat assembly arranged to support a person having right and left buttocks, right and left ischial-tuberosities, right and left thighs, and a center lower body portion located between the thighs, said assembly being arranged to provide proper support and hygienic safety, and also provide comfort, clearance and operating mobility for the person in a seated pedaling mode, a seating coasting mode, and a stand up pedaling mode, said assembly comprising:

a) a bicycle seat comprising a front portion, a rear portion, two outer side portions and a longitudinal center axis extending through the front and rear portions;

b) said bicycle seat having a functional surface area, comprising:
      i) a main support surface region;
      ii) a center tactile surface region;

c) said main support surface region comprising:
      i) a generally horizontal, upwardly facing main surface portion;
      ii) a forward support surface portion having right and left forward surface support sections extending forwardly and downwardly from the main support surface portion;

d) said center tactile surface region having a raised center surface portion and outwardly facing side tactile surface portions to engage upper rear inside thigh surface portions of the person;

e) said bicycle seat having right and left upwardly facing primary support surface zones spaced from one another on opposite sides of the longitudinal axis, located at a forward part of the main support surface portion to engage the person's ischial-tuberosities in the seated pedaling mode;

f) said main support region having right and left leading edges, each of which has an inner leading edge location adjacent to said center tactile surface portion and two outer leading edge locations, each of which is located forwardly of, and longitudinally aligned with, its related primary support zone, said outer leading edge locations being positioned rearwardly of said inner leading edge locations;

g) the primary support zones being at a height relative to a center area of the functional surface region located between the primary support zones and forwardly therefrom, to maintain the center lower body portion out of bearing contact with the functional surface region;

h) said seat assembly being characterized in that the outer leading edge location is not greater than 2.5 inches rearwardly of the inner leading location and no less than 0.5 inch rearwardly of said inner leading edge location.

2. The seat assembly as recited in claim 1, wherein the outer leading edge location is no greater than 1.6 inches rearwardly of the inner leading edge location and no less than 0.7 inch rearwardly of said inner leading edge location.

3. The seat assembly as recited in claim 2, wherein the outer leading edge location is located above the inner leading edge portion by a distance no greater than about 1.3, and not less than about 1.1 inch.

4. The seat assembly as recited in claim 1, wherein the outer leading edge location is located above the inner leading edge location by a distance no greater than about 3.17, and not less than about 0.5 inch.

5. A bicycle seat assembly arranged to support a person having right and left buttocks, right and left ischial-tuberosities, right and left thighs, and a center lower body portion located between the thighs, said assembly being arranged to provide proper support and hygienic safety, and also provide comfort, clearance and operating mobility for the person in a seated pedaling mode, a seating coasting mode, and a stand up pedaling mode, said assembly comprising:

a) a bicycle seat comprising a front portion, a rear portion, two outer side portions and a longitudinal center axis extending through the front and rear portions;

b) said bicycle seat having a functional surface area, comprising:
      i) a main support surface region;
      ii) a center tactile surface region;

c) said main support surface region comprising:
      i) a generally horizontal, upwardly facing main surface portion;
      ii) a forward support surface portion having right and left forward surface support sections extending forwardly and downwardly from the main support surface portion;

d) said center tactile surface region having a raised center surface portion and outwardly facing side tactile surface portions to engage upper rear inside thigh surface portions of the person;

e) said bicycle seat having right and left upwardly facing primary support surface zones spaced from one another on opposite sides of the longitudinal axis, located at least in part at a forward part of the main support surface portion to engage the person's ischial-tuberosities in the seated pedaling mode;

f) said main support region having a plurality of vertically and longitudinally aligned reference planes, namely a first central reference plane located at the longitudinal axis, second inner reference planes located on opposite sides of the center tactile surface region and adjacent thereto, third intermediate reference planes located on opposite sides of the longitudinal axis and spaced approximately two inches therefrom, and two fourth outer reference planes located on opposite sides of the longitudinal axis and spaced therefrom by approximately three and one-half inches; said leading edges intersecting the second, third and fourth reference planes at an inner leading edge location, an intermediate leading edge location and an outer leading edge location respectively, each of said intermediate leading edge locations being located rearwardly and upwardly of its related inner leading edge location, and each of said outer leading edge locations being located rearwardly of its related intermediate leading edge location;

g) the primary support zones being at a height relative to a center area of the functional surface region located between the primary support zones and extending forwardly therefrom, to maintain the center lower body portion out of bearing contact with the functional surface region.

6. The seat assembly as recited in claim 5, wherein leading edge portions between said inner leading edge location and said intermediate leading edge location is at an upper and outward angle, viewed from a front location of no greater than 70 degrees from a horizontal axis, and no less than 30 degrees from the horizontal axis.

7. The seat assembly as recited in claim 6, wherein the leading edge portions between the inner leading edge location and the intermediate leading edge location makes a horizontal angle, as viewed from the top of said seat assembly, which is no greater than 40 degrees from a transverse axis, and not less than 5 degrees.

8. The seat assembly as recited in claim 5, wherein leading edge portions between said inner leading edge location and said intermediate leading edge location is at an upper and outward angle, viewed from a front location of no greater than 50 degrees from horizontal axis, and no less than 40 degrees from the horizontal axis.

9. The seat as recited in claim 8, wherein the leading edge portions between the inner leading edge location and the intermediate leading edge location makes a horizontal angle, as viewed from the top of said seat, which is no greater than 30 degrees from a transverse axis, and not less than 10 degrees.

10. The bicycle seat assembly as recited in claim 5, wherein the intermediate leading edge location is spaced vertically from the inner leading edge location by a distance no greater than 2.5 inch, and no less than 0.5 inch, and is spaced rearwardly from said inner leading edge location by a distance greater than 0 inch, and no greater than 1.0 inch.

11. The seat assembly as recited in claim 10, wherein the intermediate leading edge location is spaced vertically from the inner leading edge location by a distance no greater than 1.9 inch, and no less than 0.9 inch, and is spaced rearwardly from said inner leading edge location by a distance no greater than 0.8 inch, and no less than 0.3 inch.

12. The seat assembly as recited in claim 10, wherein the outer leading edge location is spaced rearwardly from said intermediate leading edge location by a distance which is greater than 0.0 inch, and not greater than 1.5 inch.

13. The seat assembly as recited in claim 12, wherein said outer leading edge location is positioned rearwardly from said intermediate leading edge location by a distance no less than about 0.4 inch, and no greater than about 1.0 inch.

14. The assembly as recited in claim 5, wherein the outside leading edge location is positioned forwardly of a center location of its related upwardly facing primary support surface zone by a distance no greater than 2.2 inch, and no less than 0.4 inch.

15. The apparatus as recited in claim 14, wherein said outer leading edge location is positioned rearwardly from said intermediate leading edge location by a distance no less than about 1.6 inch, and no greater than about 0.6 inch.

16. A bicycle seat assembly arranged to support a person having right and left buttocks, right and left ischial-tuberosities, right and left thighs, and a center lower body portion located between the thighs, said assembly being arranged to provide proper support and hygienic safety, and also provide comfort, clearance and operating mobility for the person in a seated pedaling mode, a seating coasting mode, and a stand up pedaling mode, said assembly comprising:

a) a bicycle seat comprising a front portion, a rear portion, two outer side portions and a longitudinal center axis extending through the front and rear portions;

b) said bicycle seat having a functional surface area, comprising:
   i) a main support surface region;
   ii) a center tactile surface region;

c) said main support surface region comprising:
   i) a generally horizontal, upperwardly facing main surface portion;
   ii) a forward support surface portion having right and left forward surface support sections extending forwardly and downwardly from the main support surface portion;

d) said center tactile surface region having a raised center surface portion and outwardly facing side tactile surface portions to engage upper rear inside thigh surface portions of the person;

e) said bicycle seat having right and left upwardly facing primary support surface zones spaced from one another on opposite sides of the longitudinal axis, located at a forward part of the main support surface portion to engage the person's ischial-tuberosities in the seated pedaling mode;

f) said main support region having right and left leading edges, each of which has an inner leading edge location adjacent to said center tactile surface portion and two outer leading edge location, each of which is located forwardly of, and longitudinally aligned with, its related primary support zone, said outer leading edge locations being positioned rearwardly of said inner leading edge locations;

g) the primary support zones being at a height relative to a center area of the functional surface region located between the primary support zones and forwardly therefrom, to maintain the center lower body portion out of bearing contact with the functional surface region;

h) said seat assembly being characterized in that the outer leading edge location is located about 1.25 inch rearwardly of said inner leading edge location.

17. A bicycle seat assembly arranged to support a person having right and left buttocks, right and left ischial-tuberosities, right and left thighs, and a center lower body portion located between the thighs, said assembly being arranged to provide proper support and hygienic safety, and also provide comfort, clearance and operating mobility for the person in a seated pedaling mode, a seating coasting mode, and a stand up pedaling mode, said assembly comprising:

a) a bicycle seat comprising a front portion, a rear portion, two outer side portions and a longitudinal center axis extending through the front and rear portions;

b) said bicycle seat having a functional surface area, comprising:
   i) a main support surface region;
   ii) a center tactile surface region;

c) said main support surface region comprising:
   i) a generally horizontal, upperwardly facing main surface portion;
   ii) a forward support surface portion having right and left forward surface support sections extending forwardly and downwardly from the main support surface portion;

d) said center tactile surface region having a raised center surface portion and outwardly facing side tactile surface portions to engage upper rear inside thigh surface portions of the person;

e) said bicycle seat having right and left upwardly facing primary support surface zones spaced from one another on opposite sides of the longitudinal axis, located at a forward part of the main support surface portion to engage the person's ischial-tuberosities in the seated pedaling mode;

f) said main support region having right and left leading edges, each of which has an inner leading edge location adjacent to said center tactile surface portion and two outer leading edge location, each of which is located forwardly of, and longitudinally aligned with, its related primary support zone, said outer leading edge locations being positioned rearwardly of said inner leading edge locations;

g) the primary support zones being at a height relative to a center area of the functional surface region located between the primary support zones and forwardly therefrom, to maintain the center lower body portion out of bearing contact with the functional surface region;

h) said seat assembly being characterized in that the outer leading edge location is positioned vertically from said inner leading edge location.

18. The seat assembly as recited in claim 17, wherein the outer leading edge location is located above the inner leading edge location by a distance no greater than about 3.5 inch, and not less than about 0.5 inch.

19. The seat assembly as recited in claim 17, wherein the outer leading edge location is located above the inner leading edge location by a distance no greater than about 2.6 inch, and not less than about 1.2 inch.

20. The seat assembly as recited in claim 17, wherein the outer leading edge location is located above the inner leading edge location by a distance no greater than about 1.3 inch, and not less than about 1.1 inch.

* * * * *